Patented Dec. 22, 1953

2,663,729

UNITED STATES PATENT OFFICE 2,663,729

HALOARYLHYDROXYALKYL-UREAS

Norman E. Searle and Charles W. Todd, Wilmington, Del., assignors to E. I. du Pont de Nemours & Company, Wilmington, Del., a corporation of Delaware No Drawing. Application November 4, 1952, Serial No. 318,728

7 Claims. (Cl. 260—553)

This invention relates to a new class of organic nitrogen compounds. More particularly, it relates to a new class of tri-substituted ureas and to their preparation.

This application is a continuation-in-part of our copending application, Serial No. 186,117, filed September 21, 1950, now abandoned.

Of the sizable number of relatively high molecular weight tri-substituted ureas containing an aromatic group which have been explored, few possess satisfactory water solubility required for maximum efficiency in certain applications, particularly those of a biological nature.

It is an object of this invention to provide a new class of tri-substituted ureas and a method for their preparation. A further object is to provide a new class of tri-substituted ureas which possess appreciable water solubility. Another object is to provide new tri-substituted ureas useful as chemical intermediates and in herbicidal compositions. Other objects will appear hereinafter.

The objects of this invention are accomplished by providing the new class of N,N',N'-tri-substituted ureas having a hydrogen atom directly attached to one of the urea nitrogen atoms, N, which is bonded to a nuclear carbon of a halogenoaryl radical; the other urea nitrogen atom, N', being disubstituted and joined to one to two hydroxyalkyl radicals, any other N' substituent being an alkyl radical, preferably of one to four carbon atoms. This new class of ureas is represented by the formula:

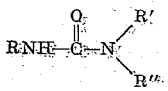

wherein R is a halogenoaryl radical, R' is a hydroxyalkyl radical, and R'' represents hydroxyalkyl or alkyl radicals. When R'' is hydroxyalkyl, this class of ureas can be designated as 3-(halogenoaryl) - 1,1 - bis(hydroxyakyl)urea and when aryl is phenyl, this class can be designated as 3 - (halogenophenyl) - 1,1 - bis - (hydroxyalkyl)ureas.

N,N',N'-tri-substituted ureas having one substituent, an aromatic radical, on one of the urea nitrogen atoms and at least one hydroxylated alkyl radical on the disubstituted other urea nitrogen, have been found to be versatile chemical intermediates which possess appreciable water solubility and activity in herbicidal compositions.

A convenient method for preparing the new ureas of this invention is illustrated by the following general equation (1) in which the halogenoaryl isocyanate, RNCO (R being a halogenoaryl radical), is reacted, usually in chemically equivalent amounts, with a secondary aliphatic amine of the formula:

wherein R' and R'' have the same meaning previously designated for these symbols in the formula of the new ureas of the invention:

(1) 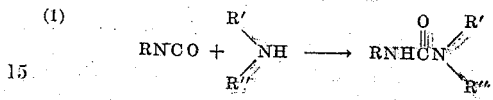

A specific reaction for the preparation of 3-(o-chlorophenyl)-1,1-bis(2-hydroxyethyl)urea is illustrated in Equation 2 below:

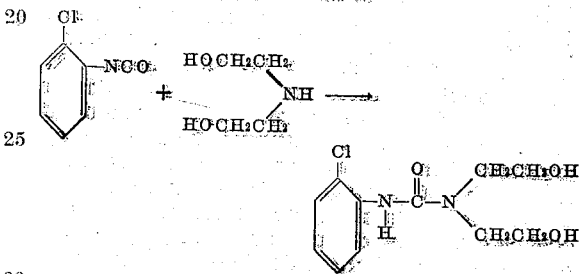

Although the above bifunctional secondary aliphatic amines are susceptible to chemical reaction at the amino and/or hydroxyl groups, it has been found that by the procedure herein described selective reaction with the amino groups can be accomplished with relative ease and in good yields. A suitable procedure consists in dropwise addition with stirring at a temperature of from 0 to 100° C. of the halogenoaryl isocyanate to the secondary amine, dissolved or suspended in an inert liquid medium; for example, dioxane, benzene, etc., and continuing the reaction with stirring until completed. Two (2) to 20 parts of inert reaction medium to each part of secondary aliphatic amine will ordinarily be satisfactory, and although not necessary, it is preferable to use essentially anhydrous media for conducting the reaction.

The ratio of isocyanate to amine can be varied widely, but for most satisfactory results, it is preferred to use the secondary amine in a molal excess of 10 to 20% over the isocyanate employed. The best results are, in general, obtained at a temperature in the range of 25 to 75° C. Under the foregoing conditions the reaction ordinarily is complete in a relatively short time, usually two hours or less, after the reactants have been thoroughly mixed at the specified temperature.

The urea obtained can be isolated by crystallization, extraction, or other suitable means, depending to a large extent on whether the urea is a solid or a liquid and the nature of the reaction media employed. For example, when dioxane or other inert water-soluble reaction medium is employed, solid ureas of a satisfactory degree of purity can usually be isolated by dilutting the reaction mixture with benzene, ethylene dichloride or other similar solvent, and removing the precipitated urea by filtration. If necessary, further purification can be achieved through crystallization, in most instances from dioxane or benzene, or a mixture of these solvents.

The halogenoaryl isocyanates used as starting materials can be prepared by the general method described in the literature [Vittenet, Bull. Soc. Chim. [3] 21, 586, 954 (1899); Organic Syntheses, Collective, vol. II, page 453; and U. S. Patent 2,428,843] which consists in heating the halogenoaryl carbamyl chloride first obtained by treating the halogenoaryl primary amine with phosgene at ordinary temperature in the presence of an appropriate solvent or reaction media.

The invention is illustrated in greater detail by the following examples in which parts, unless otherwise specified, are by weight:

EXAMPLE I

*3-(p-chlorophenyl)-1,1-bis(2-hydroxyethyl)urea*

To a stirred solution of 15.3 parts of p-chlorophenyl isocyanate in 160 parts of benzene, was added rapidly at 15° C., 12.6 parts of diethanolamine. The reaction temperature was maintained at 15–18° C. for 4 minutes by external cooling and then permitted to rise to 25° C. over a period of 1.1 hours. The reaction was further heated to reflux (80° C.) for 15 minutes. An insoluble oil separated from which the benzene was removed by decantation. Upon standing at room temperature for several hours, the oil crystallized into stout prisms which were slurried with 150 parts of cold water to remove excess diethanolamine, filtered, and washed with cold water. After drying in a vacuum desiccator over phosphoric anhydride, 22.4 parts of shiny white crystals melting at 88–89.1° C. was obtained. The yield of 3-(p-chlorophenyl)-1,1-bis(2-hydroxyethyl)urea was 87% of theoretical.

*Anal.*—Calc'd for $C_{11}H_{15}ClN_2O_3$: Cl, 13.75%. Found: Cl, 13.72%, 13.66%.

EXAMPLE II

*3-(p-bromophenyl)-1,1-bis(2-hydroxyethyl)urea*

Diethanolamine (27 parts) was added rapidly to a stirred solution of 50 parts of p-bromophenyl isocyanate in 310 parts of dioxane with the evolution of heat. The reaction mixture was then refluxed for 6 hours, cooled to room temperature and poured into 200 parts of benzene. The resulting white precipitate was filtered and air dried. There was thus obtained 61 parts (84% of the theoretical yield) of 3-(p-bromophenyl)-1,1-bis(2-hydroxyethyl)urea melting at 105° C.

*Anal.*—Calc'd for $C_{16}H_{15}BrN_2O$: Br, 26.4%. Found: Br, 26.8%.

EXAMPLE III

*3-(p-iodophenyl)-1,1-bis(2-hydroxyethyl)urea*

A solution of 61.5 parts of p-iodophenyl isocyanate in 103 parts of dry dioxane was added dropwise to a stirred solution of 29 parts of diethanolamine in 206 parts of dry dioxane. There was an immediate liberation of heat. The rate of addition was controlled so that the temperature did not rise above about 35° C. When the addition was completed, the reaction mixture was stirred at room temperature for 30 minutes and, since no crystals appeared, for an additional 30 minutes in an ice bath, a white crystalline precipitate then being formed. The crystals were recrystallized from water to yield 64 parts of 3-(p-iodophenyl)-1,1-bis(2-hydroxyethyl)urea which melted at 112.5 to 113° C. This is 73% of the theoretical yield.

*Anal.*—Calc'd for $C_{11}H_{15}IN_2O_3$: C, 37.75%; H, 4.32%. Found: C, 37.63%; H, 4.42%.

EXAMPLE IV

*3-(m-fluorophenyl)-1,1-bis(2-hydroxyethyl)urea*

To a stirred solution of 18 parts of diethanolamine in 51.5 parts of dry dioxane was added dropwise a solution of 21.5 parts of m-fluorophenyl isocyanate in 67 parts of dry dioxane, while the temperature of the reaction mixture was maintained at 20–30° C. with a cooling bath. After the addition of the isocyanate was completed, 220 parts of dry benzene was added. The white crystals which separated were recovered by filtration and dried in a vacuum (30 mm.) oven at room temperature. The 3-(m-fluorophenyl)-1,1-bis-(2-hydroxyethyl)urea thus obtained melted at 84 to 85° C. and amounted to 29 parts. This was 76.5% of the theoretical yield.

*Anal.*—Calc'd for $C_{11}H_{15}FN_2O_3$: C, 54.55%; H, 6.24%. Found: C, 54.43%; H, 6.54%.

EXAMPLE V

*3-(2,4,6-trichlorophenyl)-1,1-bis(2-hydroxyethyl)urea*

To a stirred solution of 25.6 parts of diethanolamine in 103 parts of dry dioxane was added dropwise a solution of 48.5 parts of 2,4,6-trichlorophenyl isocyanate in 103 parts of dry dioxane. Sufficient heat was liberated to raise the temperature nearly to reflux. After the addition of the isocyanate was completed and the reaction mixture had cooled to room temperature, 440 parts of dry benzene was added. The crystals which formed were removed by filtration and dried in a vacuum (30 mm.) oven at 50° C. The 3-(2,4,6-trichlorophenyl)-1,1-bis-(2-hydroxyethyl)urea thus obtained melted at 121–122° C. and amounted to 60 parts. This was 82.5% of the theoretical yield.

*Anal.*—Calc'd for $C_{11}H_{13}Cl_3N_2O_3$: C, 40.45%; H, 4.00%. Found: C, 40.12%; H, 4.27%.

EXAMPLE VI

*3-(4-chloro-1-naphthyl)-1,1-bis(2-hydroxyethyl)urea*

To a stirred solution of 21.4 parts of diethanolamine in 206 parts of dry dioxane was added dropwise a solution of 37.5 parts of 4-chloro-1-naphthyl isocyanate in 51.5 parts of dry dioxane. The reaction mixture warmed during the addition of the isocyanate. When the addition of the isocyanate was completed, 440 parts of dry benzene were added to precipitate the product. The resulting white crystalline precipitate was removed by filtration and dried in a vacuum (30 mm.) oven at 50° C. The 3-(4-chloro-1-naphthyl)-1,1-bis(2-hydroxyethyl)urea thus obtained melted at 127–128° C. and amounted to 51.5 parts. This is 90.5% of the theoretical yield.

Anal.—Calc'd for $C_{15}H_{17}ClN_2O_3$: C, 58.50%; H, 5.55%. Found: C, 58.62%; H, 5.66%.

EXAMPLE VII

*3-(p-chlorophenyl)-1-methyl-1-gluco-(2,3,4,5,6-pentahydroxyhexyl) urea*

To a stirred suspension of 70 parts of methyl glucamine in 206 parts of dry dioxane was added dropwise a solution of 50 parts of p-chlorophenyl isocyanate in 51.5 parts of dry dioxane. Heat was liberated slowly during this addition. When the solution had warmed to near reflux, all of the methyl glucamine had dissolved. Four hundred forty (440) parts of dry benzene was added to the reaction mixture, and a thick syrup separated. On long standing exposure to the air, a portion of this syrup crystallized. Using the crystalline material to induce further crystallization, the remainder of the product was recrystallized from dioxane as the monohydrate of 3-(p-chlorophenyl)-1-methyl-1-gluco-(2,3,4,5,6-pentahydroxyhexyl) urea which melted at 64.65° C. and amounted to 82 parts. The yield was 72% of the theoretical.

Anal.—Calc'd for $C_{14}H_{23}ClN_2O_7$: C, 46.00%; H, 6.35%. Found: C, 46.14%; H, 6.65%.

This invention is broadly applicable to N,N',N'-tri-substituted ureas having one monovalent halogenoaryl radical nuclearly attached to one of the urea nitrogens, N, the other urea nitrogen, N', being disubstituted and joined to two hydroxyalkyl radicals, particularly straight-chain hydroxyalkyl radicals of two to six carbon atoms, or to one of these hydroxyalkyl radicals and one alkyl radical, preferably a lower alkyl radical of up to four carbon atoms. The halogenoaryl radicals can be any of the monovalent halogenated aromatic hydrocarbon radicals, but, because of lower cost, in general, of the preparative raw materials, those ureas having halogenated aryl radicals containing one to two nuclei, such as phenyl, tolyl, xylyl, xenyl, naphthyl, methylnaphthyl, and the like are preferred. Particularly preferred ureas of the invention have halogenophenyl radicals containing from one to three halogen substituents on the aryl ring. The halogens can be fluorine, chlorine, bromine or iodine as shown by the examples.

The hydroxyalkyl radicals can be any of the monohydroxy and polyhydroxyalkyl radicals, but, because of more ready availability and satisfactory reactivity with the halogenoaryl isocyanates, RNCO, of the secondary aliphatic amines, R'R''NH, from which the new ureas are prepared, straight-chain hydroxylated alkyl radicals having from two to six carbon atoms and up to five hydroxyl groups are preferred.

Examples of these include hydroxyethyl, —CH₂—CH₂OH; hydroxypropyl,

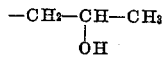

methyl hydroxybutyl,

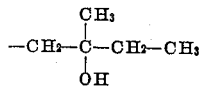

and

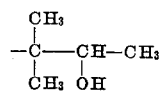

dihydroxypropyl,

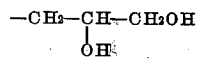

dihydroxyisopropyl,

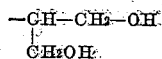

tetrahydroxypentyl, —CH₂—(CHOH)₃—CH₂OH; pentahydroxyhexyl, —CH₂(CHOH)₄—CH₂OH. Especially preferred among these hydroxyalkyl radicals because of availability are the hydroxyethyl and pentahydroxyhexyl radicals.

The alkyl radicals attached in conjunction with a hydroxyalkyl radical to the same disubstituted urea nitrogen atom, are because of better water solubility characteristics, preferably of from one to four carbon atoms, for example, methyl, ethyl, propyl and butyl.

In addition to the foregoing examples, the following examples of compounds of the invention are given as further illustration. These compounds can, of course, readily be prepared by methods similar to those set out in detail in the numbered examples above:

3-(2,4,6-trichlorophenyl)-1,1-bis(2-hydroxyethyl) urea 3-(p-chlorophenyl)-1-methyl-1-(2-hydroxyethyl) urea 3-(p-chlorophenyl)-1-isopropyl-1-(2-hydroxyethyl) urea 3-(o-chlorophenyl)-1,1-bis(2-hydroxyethyl) urea 3-(p-chlorophenyl)-1-ethyl-1-(2-hydroxyethyl) urea 3-(p-bromophenyl)-1-methyl-1-(2-hydroxyethyl) urea 3-(o-bromophenyl)-1,1-bis(2-hydroxyethyl) urea 3-(2,4-dichlorophenyl)-1-methyl-1-(2-hydroxyethyl) urea 3-(2,4-dichlorophenyl)-1,1-bis(2-hydroxyethyl) urea 3-(o-chlorophenyl)-1-methyl-1-(2-hydroxyethyl) urea 3-(p-chlorophenyl)-1-methyl-1-(2-hydroxypropyl) urea The new ureas of this invention are, for the most part, white crystalline and practically odorless solids, insoluble in benzene and ethylene dichloride, but soluble in acetone, dioxane, ethyl acetate and ethanol. They are also appreciably soluble in water, differing markedly in this respect from the corresponding 3-halogenoaryl-1,1-dialkyl ureas, which are water insoluble and limited thereby in their usefulness for certain applications.

The new ureas are useful in herbicidal compositions and, moreover, are valuable chemical intermediates. They may be sulfonated, esterified, or converted to the N-methylol derivatives which are modifiers for urea-formaldehyde derivatives.

As many apparently widely different embodiments of this invention may be made without departing from the spirit and scope thereof, it is to be understood that this invention is not limited to the specific embodiments thereof except as defined in the appended claims.

We claim:

1. A tri-substituted urea having a hydrogen atom directly attached to a urea nitrogen atom which is bonded to a nuclear carbon of a halogenoaryl radical, said urea being represented by the formula

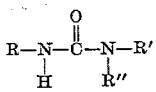

wherein R is a halogenoaryl radical containing 1 to 2 nuclei, R' is a hydroxyalkyl radical of 2 to 6 carbon atoms containing not more than 5 hydroxyl groups with a chain of a least 2 carbon atoms separating the urea nitrogen from the nearest hydroxyl group and R'' is a radical selected from the class consisting of alkyl radicals of 1 to 4 carbon atoms and hydroxyalkyl radicals of 2 to 6 carbon atoms containing not more than 5 hydroxyl groups with a chain of at least 2 carbon atoms separating the urea nitrogen from the nearest hydroxyl group.

2. A tri-substituted urea having a hydrogen atom directly attached to a urea nitrogen atom which is bonded to a nuclear carbon of a halogenoaryl radical, said urea being represented by the formula

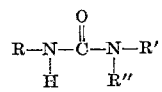

wherein R is a halogenoaryl radical containing 1 to 2 nuclei and R' and R'' are hydroxyalkyl radicals of 2 to 6 carbon atoms containing not more than 5 hydroxyl groups with a chain of at least 2 carbon atoms separating the urea nitrogen from the nearest hydroxyl group.

3. A tri-substituted urea having a hydrogen atom directly attached to a urea nitrogen atom which is bonded to a nuclear carbon of a halogenoaryl radical, said urea being represented by the formula

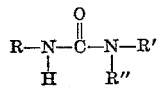

wherein R is a halogenoaryl radical containing 1 to 2 nuclei, R' is a hydroxyalkyl radical of 2 to 6 carbon atoms containing not more than 5 hydroxyl groups with a chain of at least 2 carbon atoms separating the urea nitrogen from the nearest hydroxyl group and R'' is an alkyl radical of 1 to 4 carbon atoms.

4. A tri-substituted urea having a hydrogen atom directly attached to a urea nitrogen atom which is bonded to a nuclear carbon of a halogenophenyl radical, said urea being represented by the formula

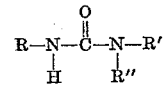

wherein R is a halogenophenyl radical and R' and R'' are hydroxyalkyl radicals of 2 to 6 carbon atoms containing not more than 5 hydroxyl groups with a chain of at least 2 carbon atoms separating the urea nitrogen from the nearest hydroxyl group.

5. A tri-substituted urea having a hydrogen atom directly attached to a urea nitrogen atom which is bonded to a nuclear carbon of a halogenophenyl radical, said urea being represented by the formula

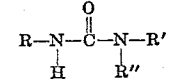

wherein R is a halogenophenyl radical, R' is a hydroxyalkyl radical of 2 to 6 carbon atoms containing not more than 5 hydroxyl groups with a chain of at least 2 carbon atoms separating the urea nitrogen from the nearest hydroxyl group and R'' is an alkyl radical of 1 to 4 carbon atoms.

6. The chemical compound 3-(p-chlorophenyl)-1,1-bis(2-hydroxyethyl)urea.

7. The chemical compound 3-(p-chlorophenyl)-1-methyl-1-(2-hydroxyethyl)urea.

NORMAN E. SEARLE.
CHARLES W. TODD.

No references cited.